United States Patent
Fukube et al.

(10) Patent No.: US 7,117,127 B2
(45) Date of Patent: Oct. 3, 2006

(54) MONITORING DEVICE AND MONITORING METHOD FOR VACUUM DEVICE

(75) Inventors: Hitoshi Fukube, Hitachiohta (JP); Kenichiro Sonobe, Hitachinaka (JP); Juntaro Arima, Hitachinaka (JP)

(73) Assignee: Hitachi, Ltd., (JP)

( * ) Notice: Subject to any disclaimer, the term of this patent is extended or adjusted under 35 U.S.C. 154(b) by 0 days.

(21) Appl. No.: 11/165,577

(22) Filed: Jun. 24, 2005

(65) Prior Publication Data

US 2006/0004544 A1   Jan. 5, 2006

Related U.S. Application Data

(63) Continuation of application No. 10/253,485, filed on Sep. 25, 2002, now Pat. No. 6,925,423.

(30) Foreign Application Priority Data

Sep. 28, 2001   (JP)   ............................. 2001-303484

(51) Int. Cl.
  G06F 17/40  (2006.01)
(52) U.S. Cl. ...................................... 702/187; 702/188
(58) Field of Classification Search ............ 702/33–36, 702/40, 74, 113–115, 125, 127, 180, 176–178, 702/188, 182–187; 715/965–970, 771, 961; 700/95, 96, 83, 108, 119–121, 110, 207; 250/309–311, 250/307, 492.21, 492.2, 492.1, 423 R, 427, 250/493.1
See application file for complete search history.

(56) References Cited

U.S. PATENT DOCUMENTS

| | | | |
|---|---|---|---|
| 5,319,580 A | | 6/1994 | Sakata et al. ................ 702/185 |
| 5,452,417 A | * | 9/1995 | Randall et al. .............. 345/501 |
| 5,790,424 A | * | 8/1998 | Sugihara et al. ............ 340/500 |
| 6,076,026 A | * | 6/2000 | Jambhekar et al. ........... 701/35 |
| 6,123,983 A | * | 9/2000 | Smith et al. ................... 427/10 |
| 6,618,692 B1 | | 9/2003 | Takahashi et al. ........... 702/188 |
| 6,683,316 B1 | | 1/2004 | Schamber et al. ........ 250/492.1 |
| 6,687,654 B1 | * | 2/2004 | Smith et al. ................. 702/183 |
| 6,907,384 B1 | * | 6/2005 | Adachi et al. .............. 702/184 |

FOREIGN PATENT DOCUMENTS

| | | |
|---|---|---|
| JP | 58-113713 | 7/1983 |
| JP | 58-113830 | 7/1983 |
| JP | 05-189026 | 7/1993 |
| JP | 10-207530 | 8/1998 |
| JP | 11-118528 | 4/1999 |

* cited by examiner

Primary Examiner—Hal Wachsman
(74) Attorney, Agent, or Firm—Dickstein Shapiro LLP

(57) ABSTRACT

A monitoring device and method, of a vacuum-system device having a vacuum portion, which can collectively perform the maintenance control of the device or counter measures to overcome drawbacks by providing a monitoring method equivalent to monitoring in real time and simultaneously based on data from respective types of sensors of the vacuum system. By visualizing the state of a driving system in a vacuum, a vacuum valve, a vacuum state and a state of an electro-optic system on a screen, the device state in a vacuum may be grasped. Further, it is possible to perform the time measuring and the comparison of data with the reference data by setting up timing charts with respect to the ON/OFF timing of various sensors, Open/Close timing and vacuum state.

12 Claims, 16 Drawing Sheets

FIG. 7

| | ABBREVIATION OF OPERATION LEVEL/INSPECTION DISPLAY/ LENGTH-MEASURING OF SEM CONSTITUENT ELEMENTS | | |
|---|---|---|---|
| SYMBOL | NAME | NORMAL OPERATION LEVEL | INSPECTION DISPLAY POSITION |
| IP1 | ION PUMP ELECTRON GUN CHAMBER | $<2 \cdot 10^{-7}$ Pa | EXHAUST SYSTEM OPERATION PANEL METER |
| IP2 | ION PUMP INTERMEDIATE CHAMBER | $<5 \cdot 10^{-6}$ Pa | EXHAUST SYSTEM OPERATION PANEL METER |
| IP3 | ION PUMP FOCUSING LENS PORTION | $<5 \cdot 10^{-5}$ Pa | EXHAUST SYSTEM OPERATION PANEL METER |
| Pe1 | PENNING GAUGE WAFER CHAMBER | $<6 \cdot 10^{-3}$ Pa | EXHAUST SYSTEM OPERATION PANEL METER |
| Pe2 | PENNING GAUGE LOADER CHAMBER | $<1 \cdot 10^{-2}$ Pa | EXHAUST SYSTEM OPERATION PANEL METER |
| Pi1, 2, 3 | PIRANI GAUGE | | |
| TMP1 | TURBO MOLECULAR PUMP SAMPLE CHAMBER | | EXHAUST SYSTEM OPERATION PANEL LAMP |
| TMP2 | TURBO MOLECULAR PUMP TRANSPORT CHAMBER | | EXHAUST SYSTEM OPERATION PANEL LAMP |
| RP1, 2 | ROTARY (ROUGH PUMPING) PUMP | | EXHAUST SYSTEM OPERATION PANEL LAMP |
| AV4, 6, 7, 8 | AIR LOCK (VACUUM) VALVE | | EXHAUST SYSTEM OPERATION PANEL LAMP |
| AV3 | AIR LOCK (VACUUM) VALVE | | EXHAUST SYSTEM OPERATION PANEL LAMP |
| AV1, 2, 5 | AIR LOCK (VACUUM) VALVE | | EXHAUST SYSTEM OPERATION PANEL LAMP |
| APS | VALVE DRIVING AIR PRESSURE SENSOR | | EXHAUST SYSTEM OPERATION PANEL LAMP |
| APT | ELECTRON BEAM STOP | | |
| N2-1, 2 | LEAK NITROGEN GAS SOURCE | | EXHAUST SYSTEM OPERATION PANEL LAMP |
| VS1, 2, 3, 4 | ATMOSPHERIC PRESSURE DISPLAY SENSOR | | EXHAUST SYSTEM OPERATION PANEL LAMP |
| N2 | NITROGEN GAS SOURCE | 200–680kPa | GAS SOURCE AT INSTALLATION SITE |
| | AIR PRESSURE SOURCE | 600–880kPa | GAS SOURCE AT INSTALLATION SITE |
| | VACUUM SOURCE | 1.3–21.3kPa | GAS SOURCE AT INSTALLATION SITE |
| MV1, 2, 3 | MANUAL VALVE | | EXHAUST SYSTEM OPERATION PANEL LAMP |
| LV1, 2, 3 | LEAK VALVE | | EXHAUST SYSTEM OPERATION PANEL LAMP |
| F | LEAK GAS FILTER | | |
| XD | WAFER EXCHANGE CHAMBER LID | | |
| LC | WAFER TRANSPORT CHAMBER | | |
| SC | SAMPLE CHAMBER | | |
| XC | WAFER EXCHANGE CHAMBER | | |
| | STAGE LOADER | | |
| X(Y)+(−) | AXIS AND DIRECTION OF STAGE MOVEMENT | | STAGE LOADER MANIPULATION PANEL |
| L+(−) | WAFER HOLDER TRANSPORT : LOAD LOCK CHAMBER ⇔ STAGE | | STAGE LOADER MANIPULATION PANEL |
| ARM | WAFER MOVEMENT : WAFER HOLDER ⇔ STATION | | STAGE LOADER MANIPULATION PANEL |
| PALETTE | MOVE CENTER PALETTE OF STATION UPWARDLY AND DOWNWARDLY | | STAGE LOADER MANIPULATION PANEL |
| HOLDER ON STAGE | WAFER HOLDER BEING ON SAMPLE CHAMBER STAGE | | |
| HOLDER ON LOADER | WAFER HOLDER BEING IN HOME POSITION OF LOAD LOCK CHAMBER | | |
| WAFER ON STATION | WAFER BEING IN STATION OF LOAD LOCK CHAMBER | | |
| WAFER ON HOLDER | WAFER BEING ON WAFER HOLDER OF LOAD LOCK CHAMBER | | |
| WAFER STATION UP | WAFER STATION BEING IN SAMPLE EXCHANGE CHAMBER XC | | |
| WAFER STATION DOWN | WAFER STATION BEING IN LOAD LOCK CHAMBER | | |

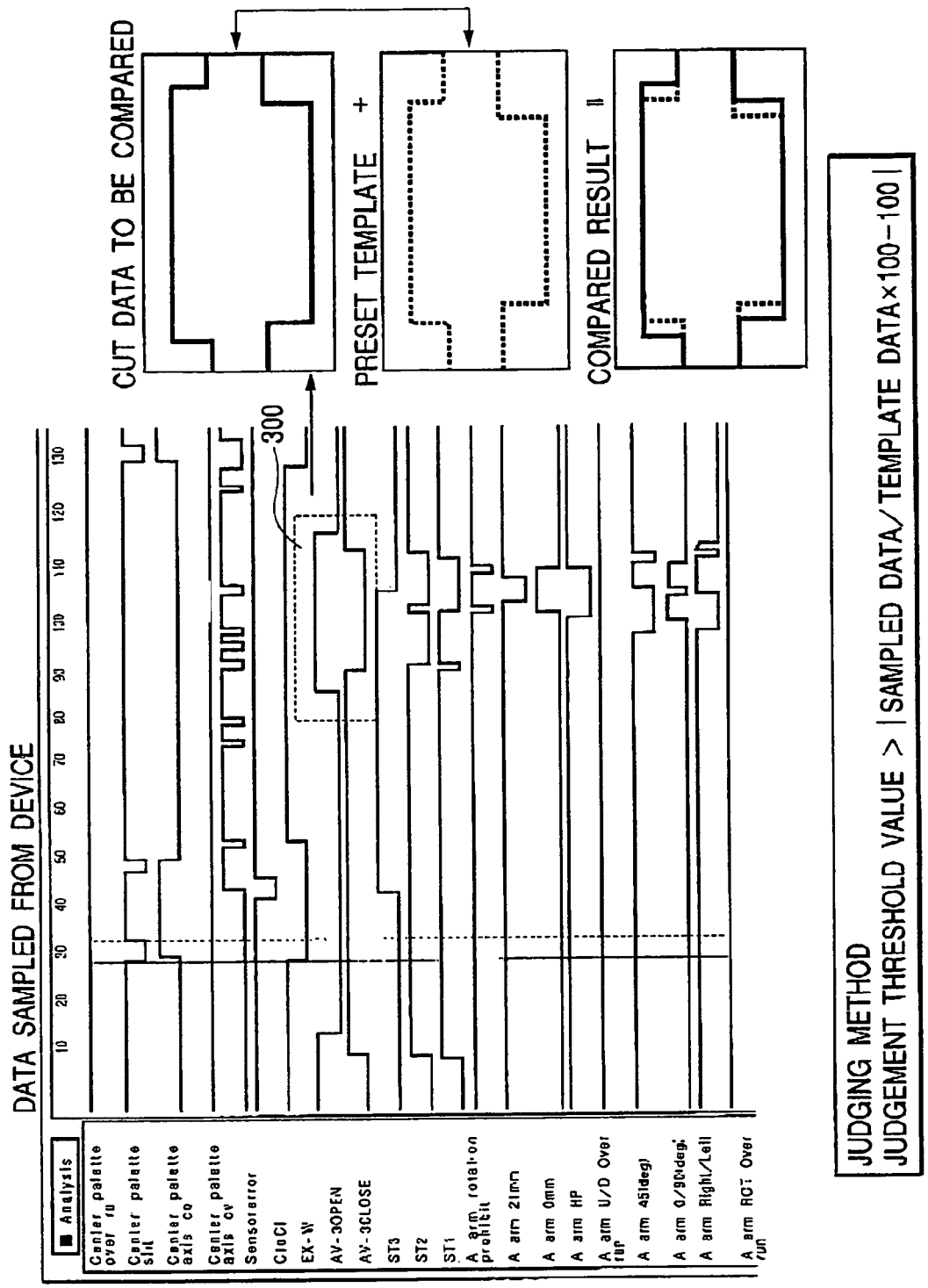

MONITORING DEVICE AND MONITORING METHOD FOR VACUUM DEVICE

This application is a continuation of application Ser. No. 10/253,485, filed on Sep. 25, 2002, now U.S. Pat. No. 6,925,423, issued Aug. 2, 2005, which is hereby incorporated by reference in its entirety.

BACKGROUND OF THE INVENTION

1. Technical Field of the Invention

The present invention relates to a monitoring method and a monitoring device of a vacuum-system device having a vacuum portion such as a length-measuring SEM (Scanning Electron Microscope) or a semiconductor manufacturing device having a vacuum processing device (hereinafter referred to as "vacuum device").

2. Description of the Related Art

Conventionally, to grasp a state in the inside of a vacuum device, a dedicated measuring device or a dedicated vacuum gauge is connected to the vacuum device and the monitoring of the state of the inside of the vacuum device is performed each time when the monitoring is necessary.

To enable the real time monitoring of the state of the device in the conventional device, it is necessary to make respective types of sensors measure states in which measuring devices are connected and to analyze data on the result of measurement. Usually, a large number of sensors are mounted in the inside of the vacuum device. Accordingly, it is difficult to measure the state of sensors simultaneously and hence, the states of respective parts of the vacuum device are not grasped simultaneously so that the analysis is performed one by one. Particularly, with respect to a length-measuring SEM which is used in the manufacturing of semiconductor substrates, an extremely large number of sensors are present in the inside of a vacuum chamber (portion) of the device to provide the automation. The same goes for the semiconductor manufacturing device. In such a vacuum device, it is difficult to monitor the states of all sensors in real time and collectively. When the monitoring is not performed in real time and collectively, it is difficult to avoid a large burden when the maintenance control of the device or countermeasures to overcome drawbacks are to be performed.

SUMMARY OF THE INVENTION

The present invention has been made in view of the above and it is an object of the present invention to provide a monitoring device and a method which can simply and collectively perform the maintenance control of the device or counter measures to overcome drawbacks by providing a monitoring method equivalent to monitoring in real time and simultaneously based on data from respective types of sensors of the vacuum device.

The present invention provides a monitoring device of a vacuum device having a vacuum system comprising a screen display device, a screen display processing device which receives operation information signals from the vacuum system as input data and performs screen display processing so as to make the screen display device perform a screen display, and a memory device which stores basic monitoring data and operation history data of a plurality of constituent parts which constitute the vacuum system, wherein on a screen of the screen display device, the basic monitoring data and the operation history data of the plurality of constituent parts are displayed as timing charts which progress simultaneously in comparison, and a display which designates simultaneous time positions over a plurality of constituent parts of the vacuum system on the timing charts is performed.

The present invention further provides a monitoring device of a vacuum device having a vacuum system comprising a screen display device, a screen display processing device which receives operation information signals from the vacuum system as input data and performs screen display processing so as to make the screen display device perform a screen display, and a memory device which stores basic monitoring data and operation history data of a plurality of constituent parts which constitute the vacuum system, wherein on a screen of the screen display device, the plurality of constituent parts are displayed, and the basic monitoring data and the operation history data of the constituent parts are displayed as timing charts which progress simultaneously in comparison, and when simultaneous time positions are designated extending over the plurality of constituent parts of the vacuum system on the timing charts, operation states of the constituent parts which correspond to the positions are displayed together.

The present invention still further provides a monitoring device of a vacuum device having a vacuum system comprising a screen display device, a screen display processing device which receives operation information signals from the vacuum system as input data and performs screen display processing so as to make the screen display device perform a screen display, and a memory device which stores basic monitoring data and operation history data of a plurality of constituent parts which constitute the vacuum system and a predetermined difference between the basic monitoring data and the operation history data, and a processing device which compares the basic monitoring data and the operation history data of the plurality of constituent parts as timing charts which progress simultaneously, and judges whether any one of the plurality of constituent parts exceeds the difference at the designated simultaneous time.

The present invention still further provides a monitoring device of a vacuum device having a vacuum system which produces a vacuum comprising a screen display device, a screen display processing device which receives operation information signals from the vacuum system as input data and performs screen display processing so as to make the screen display device perform a screen display, and a memory device which stores basic monitoring data and operation history data of a plurality of constituent parts which constitute the vacuum system and a predetermined difference between the basic monitoring data and the operation history data, and a processing device which compares the basic monitoring data and the operation history data of the constituent parts as timing charts which progress simultaneously, and judges whether any one of the plurality of constituent parts exceeds the difference at the designated simultaneous time, wherein on a screen of the screen display device, the plurality of constituent parts are displayed, and the basic monitoring data and the operation history data of the constituent parts are displayed as timing charts which progress simultaneously in comparison, and when simultaneous time positions are designated extending over the plurality of constituent parts of the vacuum system on the timing charts, operation states of the constituent parts which correspond to the positions are displayed together.

The present invention still further provides a monitoring method of a vacuum device having a vacuum system which produces a vacuum comprising a step in which operation information signals from the vacuum system are inputted as data and screen display processing is performed, a step in which basic monitoring data and operation history data of a plurality of constituent parts which constitute the vacuum system are stored, a step in which the basic monitoring data and the operation history data of the plurality of constituent parts are displayed on a screen of the screen display device as timing charts which progress simultaneously in comparison, and a step in which a display which designates simultaneous time positions extending over the plurality of constituent parts of the vacuum system on the timing chart is performed.

The present invention still further provides a monitoring method of a vacuum device which has a vacuum system producing a vacuum and is installed at a remote place being characterized in that operation information signals from the vacuum system of the vacuum device which is preliminarily determined by a contract are inputted as data and screen display processing is performed, basic monitoring data and operation history data of a plurality of constituent parts which constitute the vacuum system are stored, with respect to the vacuum device, the constituent parts are sequentially displayed on a screen of the screen display device, and the basic monitoring data and the operation history data of the plurality of constituent parts are displayed as timing charts which progress simultaneously in comparison, and when simultaneous time positions are designated extending over the plurality of constituent parts of the vacuum system on the timing charts, operation states of the constituent parts which correspond to the positions are reported.

The present invention still further provides a monitoring method of a vacuum device which has a vacuum system producing a vacuum being characterized in that operation information signals from the vacuum system of the vacuum device which is preliminarily determined by a contract are inputted as data through a communication network and screen display processing is performed, basic monitoring data and operation history data of a plurality of constituent parts which constitute the vacuum system are stored, with respect to the vacuum device, the constituent parts are sequentially displayed on a screen of the screen display device, and the basic monitoring data and the operation history data of the plurality of constituent parts are displayed as timing charts which progress simultaneously in comparison, and when simultaneous time positions are designated extending over the plurality of constituent parts of the vacuum system on the timing charts, operation states of the constituent parts which correspond to the positions are displayed, and a period necessary for the difference between the basic monitoring data and the operation history data to reach a predetermined difference is predicted based on the state of the difference between the basic monitoring data and the operation history data from the timing charts which progress simultaneously every contract and next maintenance time is reported.

BRIEF EXPLANATION OF DRAWINGS

FIG. 7 is an overall chart showing check positions collectively;

FIG. 16 is a template comparison and judging chart.

DESCRIPTION OF THE PREFERRED EMBODIMENTS

Embodiments according to the present invention are explained in conjunction with drawings hereinafter.

Among vacuum devices, the explanation is made by taking a length-measuring SEM as an example hereinafter. However, the present invention is applicable to any vacuum device having a vacuum portion.

Figure 1:
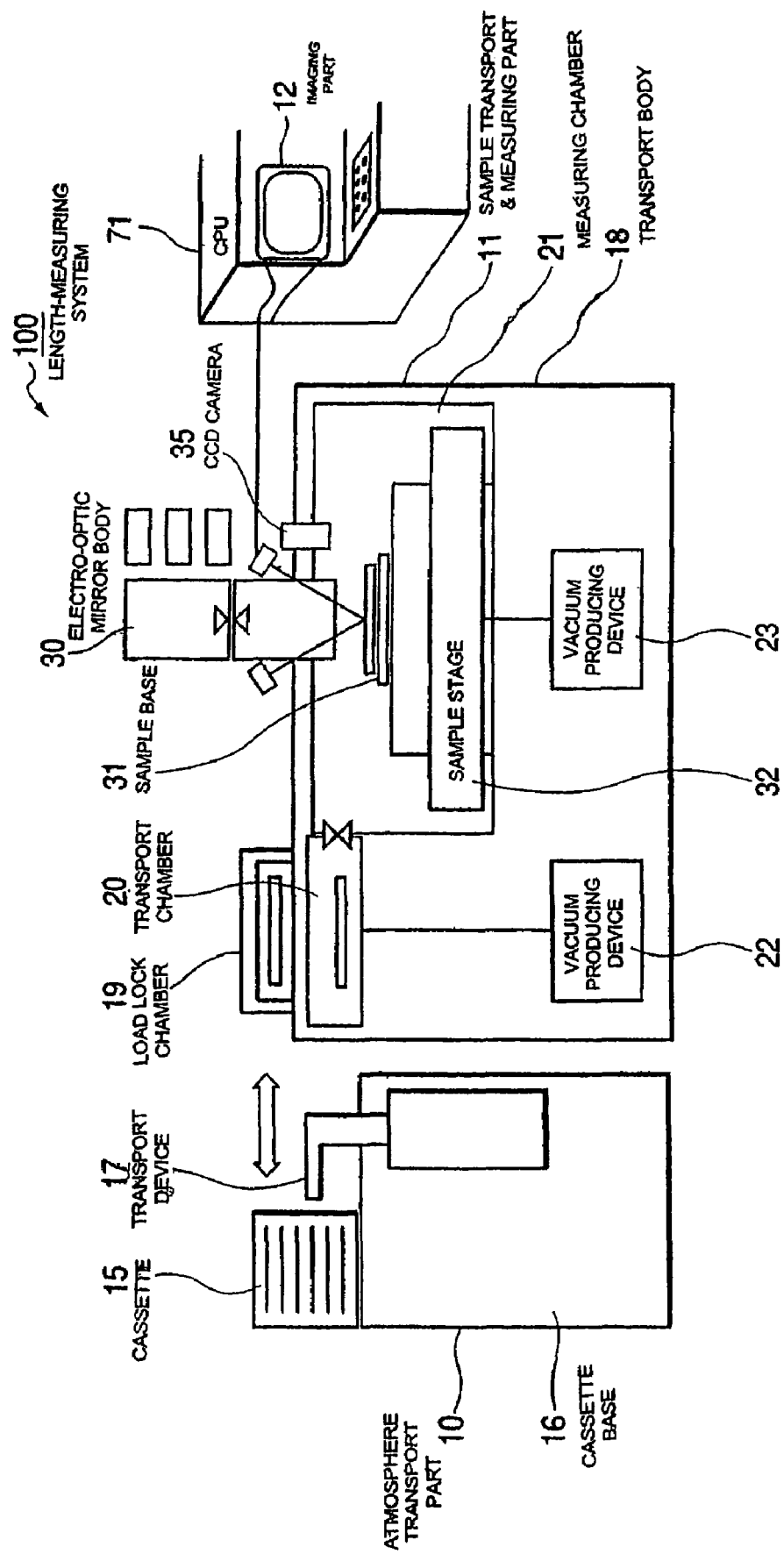
FIG. 1 is a schematic constitutional view of a length-measuring system according to an embodiment of the present invention.
Figure 2:
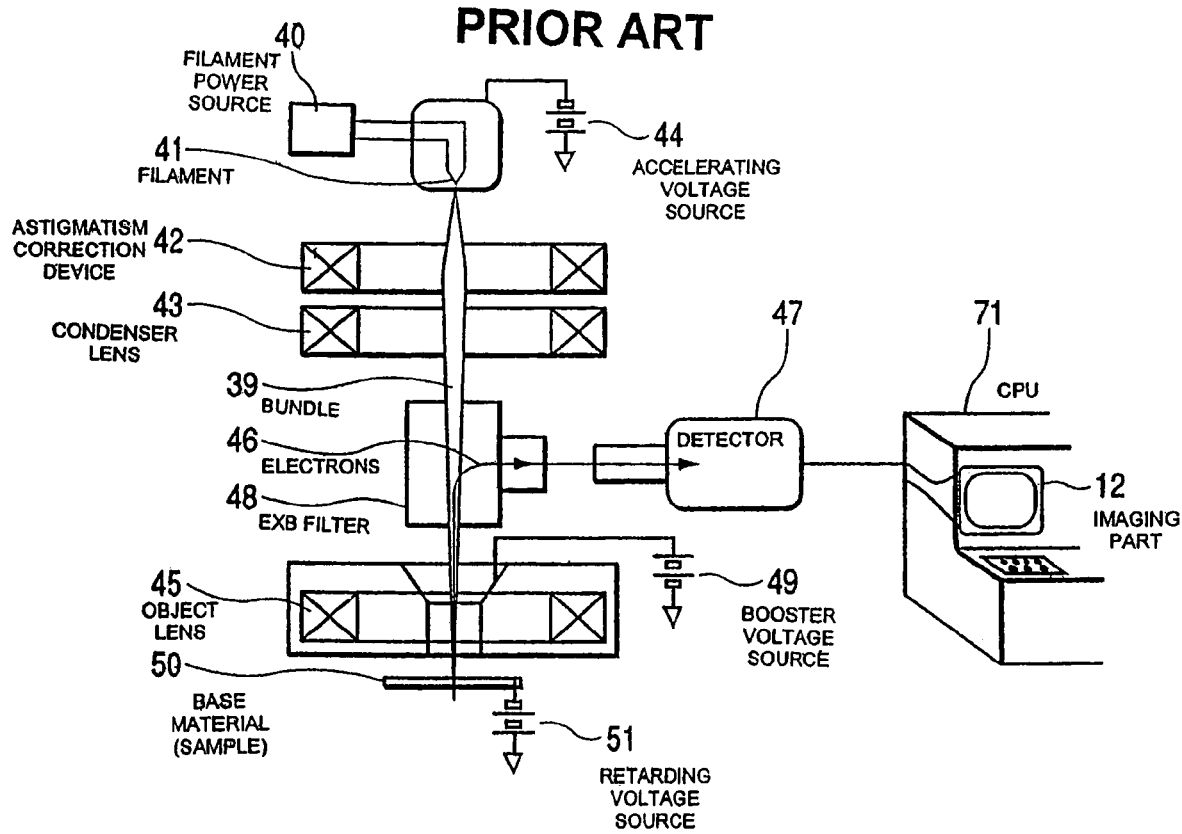
FIG. 2 is a partial detailed constitutional view of the length-measuring system.

FIG. 1 shows a constitution of a length-measuring system according to length-measuring SEM which constitute an embodiment of this invention and FIG. 2 shows the constitution of an electro-optic system which performs the function of the length-measuring SEM. In these drawings, a length-measuring system 100 is constituted of an atmosphere transport system having an atmosphere transport part 10, a vacuum system having a sample transport and measuring part 11, and a display viewing and manipulation system having an imaging part 12.

The atmosphere transport part 10 includes a cassette (that is, hoop) 15 which accommodates and holds a plurality of substrates constituting a plurality of samples, a cassette base 16 and a transport device 17 having an arm which is extended into the inside of the cassette 15 for performing loading and unloading of the substrates. The transport device 17 is constituted of a robot for transporting and is arranged either in vacuum or in a controlled atmosphere. The robot includes a moving portion which moves in the X axis direction, the Y axis direction and the Z axis direction and is rotatable in the horizontal direction. The above-mentioned arm can be extended into a load lock chamber 19.

The sample transport and length-measuring part 11 includes a transport body 18, the above-mentioned load lock chamber (may be also referred to as "double load lock chamber") 19, a transport chamber 20 and a measuring chamber 21 (sample chamber).

Vacuum producing devices 22, 23 are respectively connected to the transport chamber 20 and the measuring chamber 21 so that the transport chamber 20 and the measuring chamber 21 can be controlled in vacuum or under a controlled atmospheric pressure. The vacuum producing devices 22, 23 are controlled by a vacuum producing control device having an exhaust system (not shown in the drawing).

As shown in the drawing, an electro-optic mirror body 30 is arranged in the measuring chamber 21. Below the electro-optic mirror body 30, a sample base 31 and a sample stage 32 for controlling and fixing the sample base 31 are disposed.

Further, as shown in the drawing, in the measuring chamber 21, a CCD camera 35 having an optical microscope is arranged parallel to the electro-optic mirror body 30.

As shown in FIG. 2, the electro-optic mirror body 30 which constitutes the length-measuring system 100 includes, as has been well known, an electro-optic system (lens-barrel portion), a sample chamber, an exhaust system, and a display viewing/manipulation system. The electro-optic system is constituted of a filament power source 40 and a filament 41 which constitute an electron gun generating accelerated electrons, a lens system which focuses a bundle 39 of accelerated electrons (primary electron beams) and converges the bundle 39, and a detector 47 (SE/BSE) which detects secondary electrons generated from the sample or the like. The electron gun is a portion which constitutes a source for generating accelerated electrons having certain energies. A condenser lens 43 (focusing lens) is constituted of a pull-out electrode and an anode and accelerating voltages are applied to a cathode using an accelerating voltage source 44. In the lens system, a focusing lens, an object lens, an object lens stop, a scanning coil, an astigmatism correction device 42 and the like are mounted. In the drawing, numeral 45 indicates an object lens and numeral 48 indicates an EXB filter. A booster voltage source 49 for applying voltage is connected to the object lens 45. The detector 47 is a device for detecting the secondary electrons and reflection electrons 46. Since the secondary electrons exhibit low energy, the secondary electrons are collected by a collector and are converted into photo electrons by a scintillator and are subjected to signal amplification by a photo electron amplifier tube. To detect the reflected electrons, the scintillator or semiconductor type is used.

A sample base is installed in the measuring chamber which constitutes the sample chamber and a base material (sample) 50 such as wafer is placed on the sample base. Further, a sample stage, a sample loading device, a spectroscope for X ray detection and the like are mounted on the sample base. A retarding voltage source 51 for applying voltage is mounted on the base material 50. The sample stage has functions of moving in the X, Y and Z directions rotating and tilting. As an exhaust device of the vacuum system, a rotary pump, an oil diffusion pump or the like can be used.

The display viewing/manipulation system displays a secondary electron image, a reflection electron image, an X ray image and the like on the imaging part 12. While performing image displaying and viewing, the adjustment of radiation current and focusing and the like are performed. Analog signals which constitute an output such as the secondary electron image are converted into digital signals and are displayed on the imaging part 12 and served for various analysis (measurement). Further, this image can be transmitted as image signals to a monitoring device disposed at a remote place through a communication network which constitute communication lines as will be explained later.

Further the display viewing/manipulation system displays timing charts for monitoring the degree of vacuum in the inside of the sample transport and length-measuring part 11 or the manipulation states of respective parts as images. The image signals are transmitted to the monitoring device disposed at a remote place through the communication lines. Then, the states of respective parts of the vacuum device are remotely monitored and served for the maintenance control and the adjustment of troubles.

Figure 3:
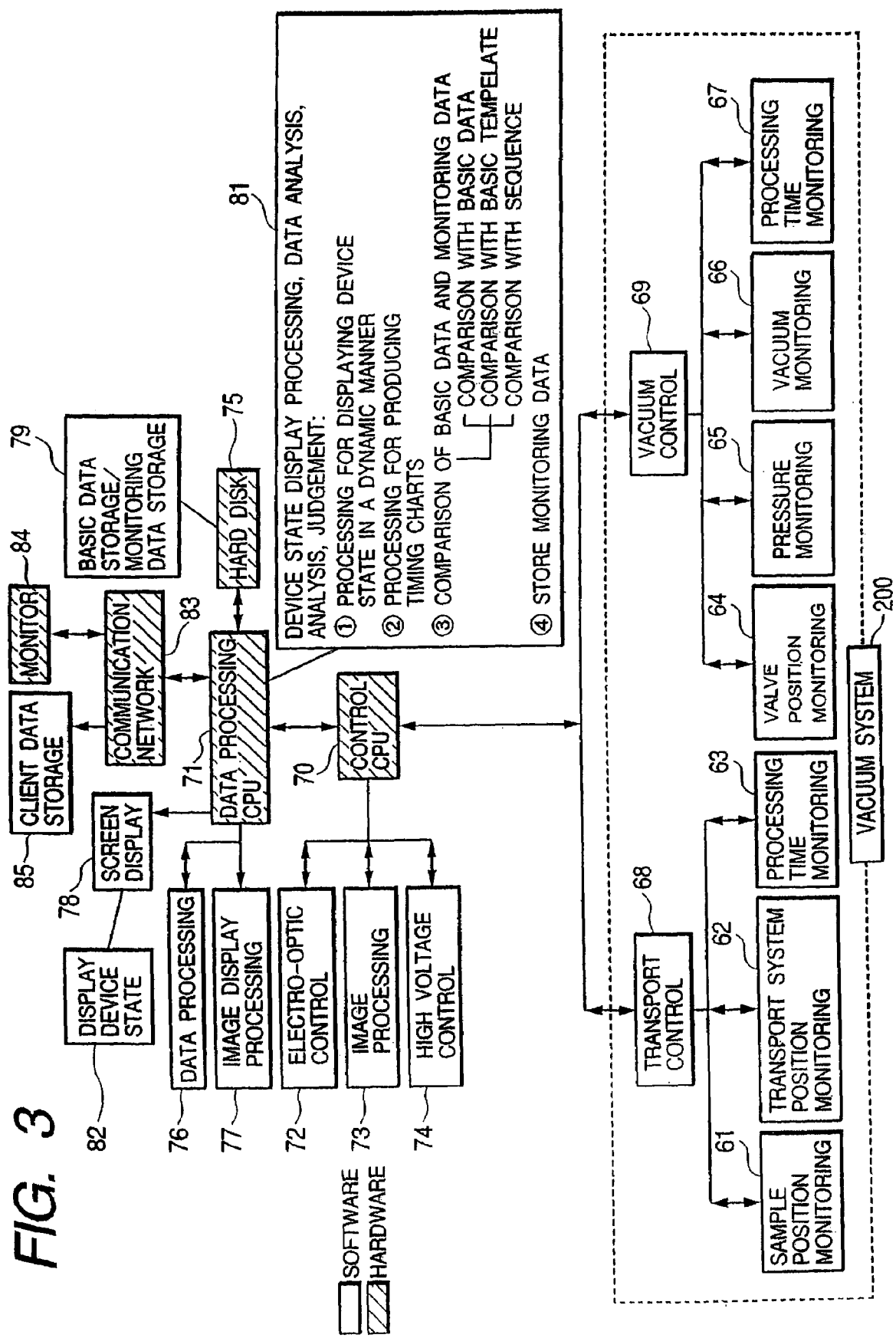
FIG. 3 is a block diagram of the embodiment of the present invention.

FIG. 3 shows the embodiment of the present invention using a block diagram.

In the drawing, a vacuum system 200 performs sample position monitoring 61, transport system position monitoring 62 and processing time monitoring 63 as a group A and valve position monitoring 64, pressure monitoring 65, a vacuum monitoring 66 and processing time monitoring 67 as a group B. Transport control 68 is performed based on data obtained by monitoring of the group A and a vacuum control 69 is performed based on data obtained by monitoring of the group B. A control CPU 70 is used for these controls.

The control CPU 70 is connected to a data processing CPU 71 and is also capable of performing electro-optic control 72, image processing 73 and high voltage control 74.

The data processing CPU 71 is connected to a hard disk 75 and can perform data processing 76 and image display processing 77. That is, the data processing CPU 71 functions as an image display processing device which performs image display processing and allows the imaging part 12 which constitutes an image display device to perform a screen display 78.

In the hard disk 75, basic monitoring data which constitutes base data and operation history data (reference data) which constitutes monitoring data are stored (base data storage, monitoring data storage 79).

The data processing CPU 71 has functions of performing data analysis, analysis and judgement 81 in the device display processing device. These functions includes following processing.

(1) processing which displays the states of the device in a dynamic manner (2) processing which produces and displays timing charts including comparison with basic data, comparison in basic temperate, and comparison with sequence (3) processing which stores and displays monitoring data The processing function of generating and displaying the timing charts can display the basic operation monitoring data and the operation history data of the device constitution, particularly, the respective parts of the vacuum system as the timing charts which progress simultaneously on the screen of the image display device. In this case, the stored basic monitoring data and operation history data are used and are displayed in a parallel form.

These results are displayed as a display 82 consisting of a device state display, a timing chart display and a comparison data display on the screen display 78.

As described above, with respect to the vacuum system, when the operational states are sequentially reported from the monitoring sensors which monitor respective parts and the operational states are stored as operation history data and a device state monitoring demand is made, the operation history data is displayed in parallel with the stored basic monitoring data in a form of simultaneous progress and the difference state between both data is displayed in a state that the difference state is classified by color display using timing charts. Further, the constituent portions of respective parts are displayed in an interlocking manner with the movement of the device state.

An operator or a maintenance man monitoring the screen of the image of the imaging part 12 on the data processing CPU 71 can perform the analysis and judgement necessary for maintenance control and adjustment of troubles of the vacuum system based on the device state, the timing charts and the comparison data displayed as shown in the display 82. However, it may be possible that by making use of the function of the data processing CPU 71, the CPU automatically performs data analysis, automatically performs analysis and judgement, and automatically performs the display.

On the other hand, the functions of data processing CPU 71 may be simplified and may have the communication function so that a content displayed on the screen display 78 may be displayed on a monitoring device 84 through a communication network 83. In this case, the basic data storage function and the monitoring data storage 79 function of the hard disk 75 are stored in the monitoring device 84 as a client data storage 85. Further, the monitoring device 84 has a function of screen display 78 and performs various types of displays shown in the display 82.

In this method, the monitoring device 84 can sequentially perform the remote monitoring with respect to a plurality of length-measuring systems 100 so that it is possible to propose a new business model based on monitoring and reports. That is, in the monitoring method of the vacuum device which has the vacuum system producing a vacuum and the electro-optic system and is installed at a remote place, operation information signals from the vacuum system of the vacuum device and the electro-optic system which are preliminarily determined by the contract are inputted as data through the communication network and screen display processing is performed. Then, basic monitoring data and operation history data of the constituent parts which constitute the vacuum system or the electro-optic system are stored. Then, with respect to the vacuum device, the constituent parts are sequentially displayed on the screen of the screen display device and the basic monitoring data and the operation history data of the plurality of constituent parts are displayed as timing charts which progress simultaneously in comparison. Further, when simultaneous time positions are designated extending over the constituent parts of the vacuum system and the electro-optic system on the timing charts, operation states of the constituent parts which correspond to the positions are displayed and the timing charts which progress simultaneously and the operation states are reported for every contract. Alternatively, in a monitoring method of a vacuum device installed at a remote place which has a valve system for manipulating a vacuum system producing a vacuum and an electro-optic system, operation information signals from the vacuum system of the vacuum device and the electro-optic system which are preliminarily determined by a contract are inputted as data through a communication network and screen display processing is performed. Then, basic monitoring data and operation history data of constituent parts which constitute the vacuum system and the electro-optic system are stored. With respect to the vacuum device, the constituent parts are sequentially displayed on the screen of the screen display device, and the basic monitoring data and the operation history data of the constituent parts are displayed as timing charts which progress simultaneously in comparison. Further, when simultaneous time positions are designated extending over the constituent parts of the vacuum system and the electro-optic system on the timing charts, operation states of the constituent parts which correspond to the positions are displayed. Further, a period necessary for the difference between the basic monitoring data and the operation history data to reach a predetermined difference is predicted based on the state of the difference between the basic monitoring data and the operation history data from the timing charts which progress simultaneously every contract and next maintenance time is reported.

Figure 4:
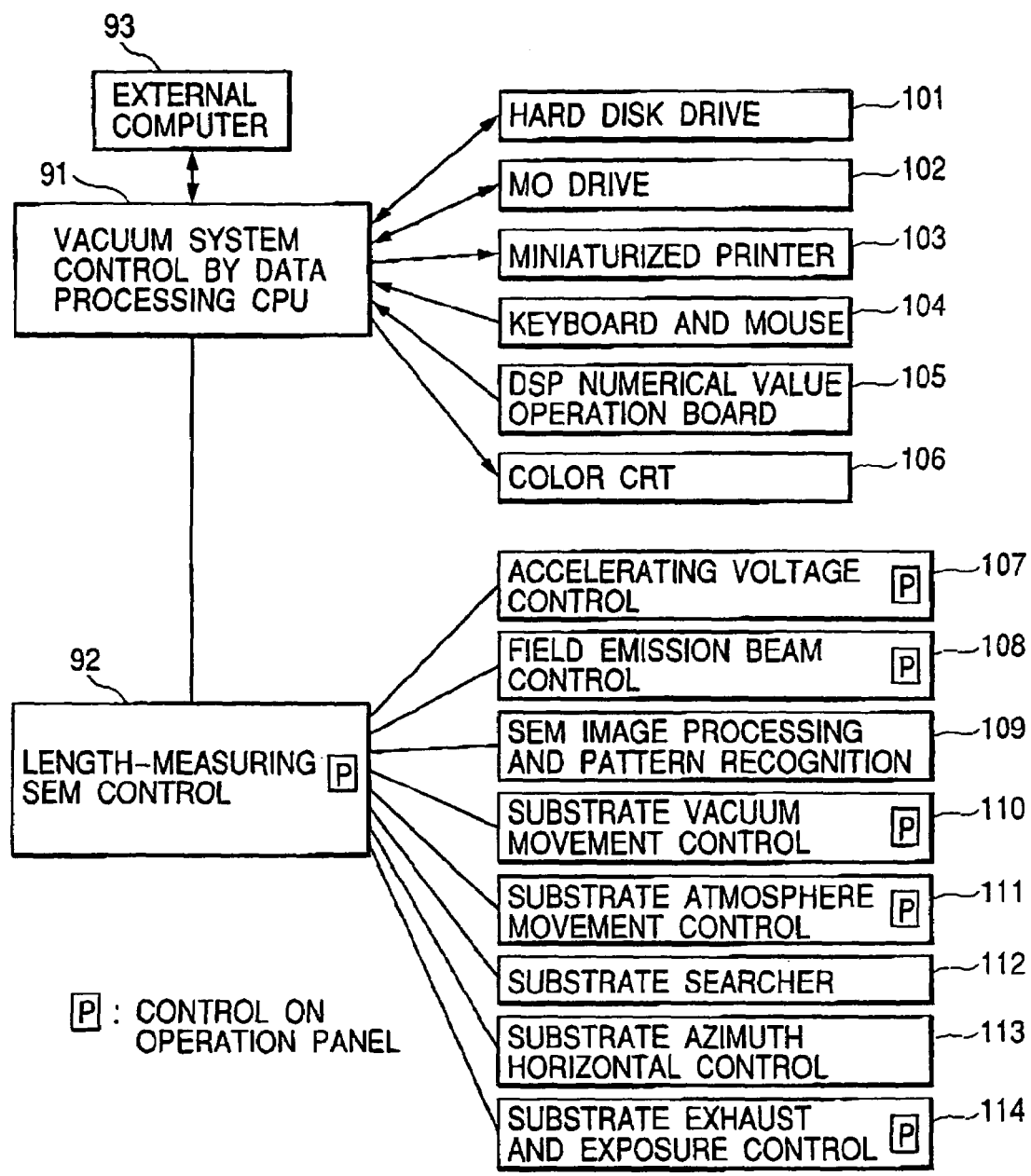
FIG. 4 is a data processing state chart.

FIG. 4 shows the state of the vacuum system control 91 and the length-measuring SEM control 92 performed by the data processing CPU 71. The data processing CPU 71 is connected with an external computer 93. The vacuum system control 91 is performed by using a hard disk drive 101, an MO drive 102, a keyboard and a mouse 104, and a DSP numerical value operation board 105. The result of the control is displayed on a miniaturized printer 103 and a color CRT 106.

The length-measuring SEM control 92 is performed by an accelerating voltage control 107, a field emission beam control 108, an SEM image processing and pattern recognition 109, a substrate vacuum movement control 110, a substrate atmosphere movement control 111, a substrate searcher 112, a substrate azimuth horizontal control 113, and an exhaust and exposure control 114.

Figure 5:
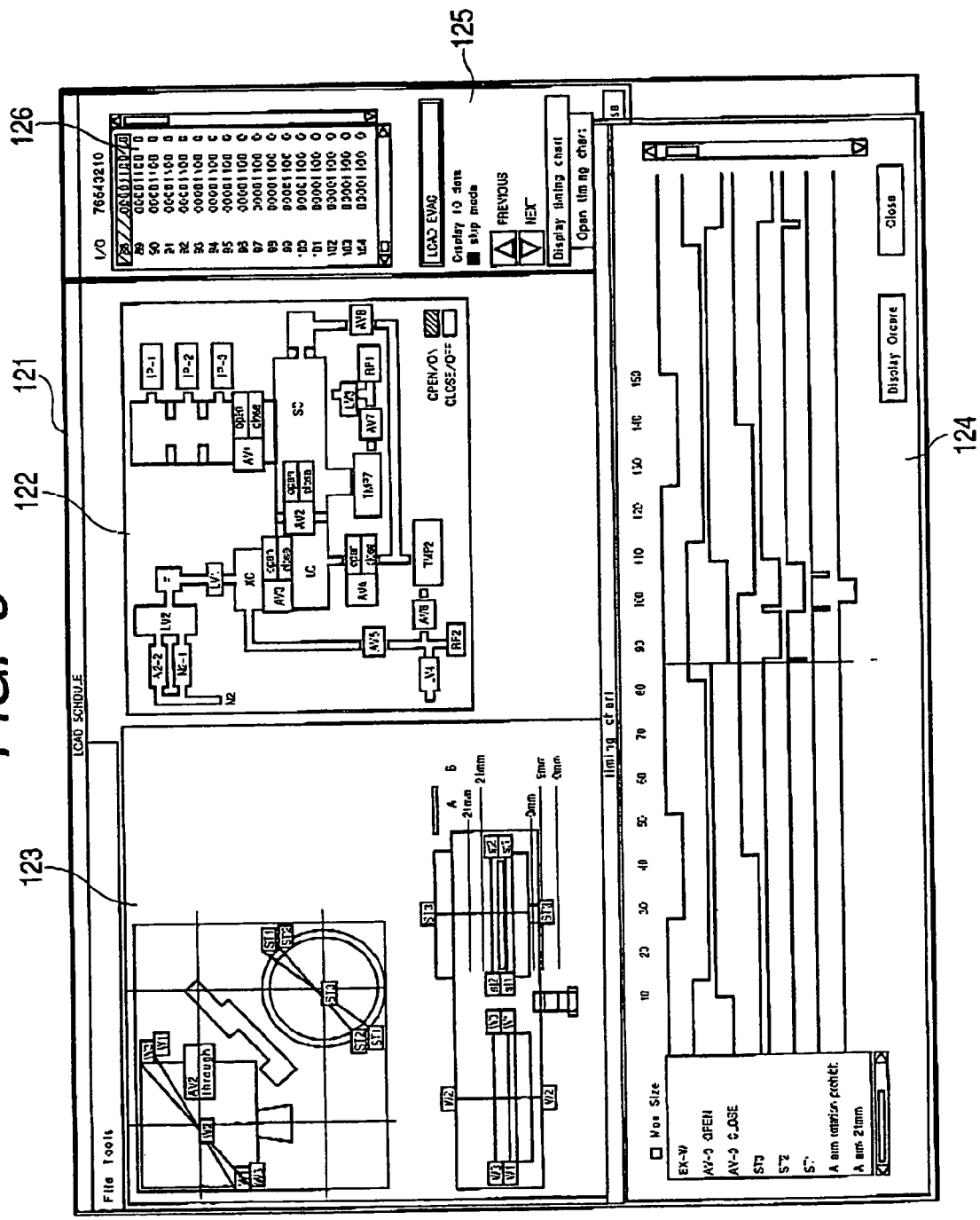
FIG. 5 is a display screen chart showing one example of a display screen.

FIG. 5 shows one example of a display screen which is displayed on the screen of the imaging part 12. In this example, on the screen 121, an exhaust system chart 122, a sample transport system chart 123 and a timing charts 124 are displayed. A manipulation part 125 and a device operation history part 126 are provided at a side portion of the screen 121.

In this manner, on one screen, the timing chart 124 with respect to respective constituent parts of the vacuum system, and the exhaust system chart 121 and the sample transport system state chart 123 which display respective constituent parts relevant to the timing chart are displayed. Accordingly, it is possible to have an advantageous effect that when any trouble occurs in the length-measuring SEM, causes of the trouble can be easily located and the countermeasure can be taken easily.

Figure 6:
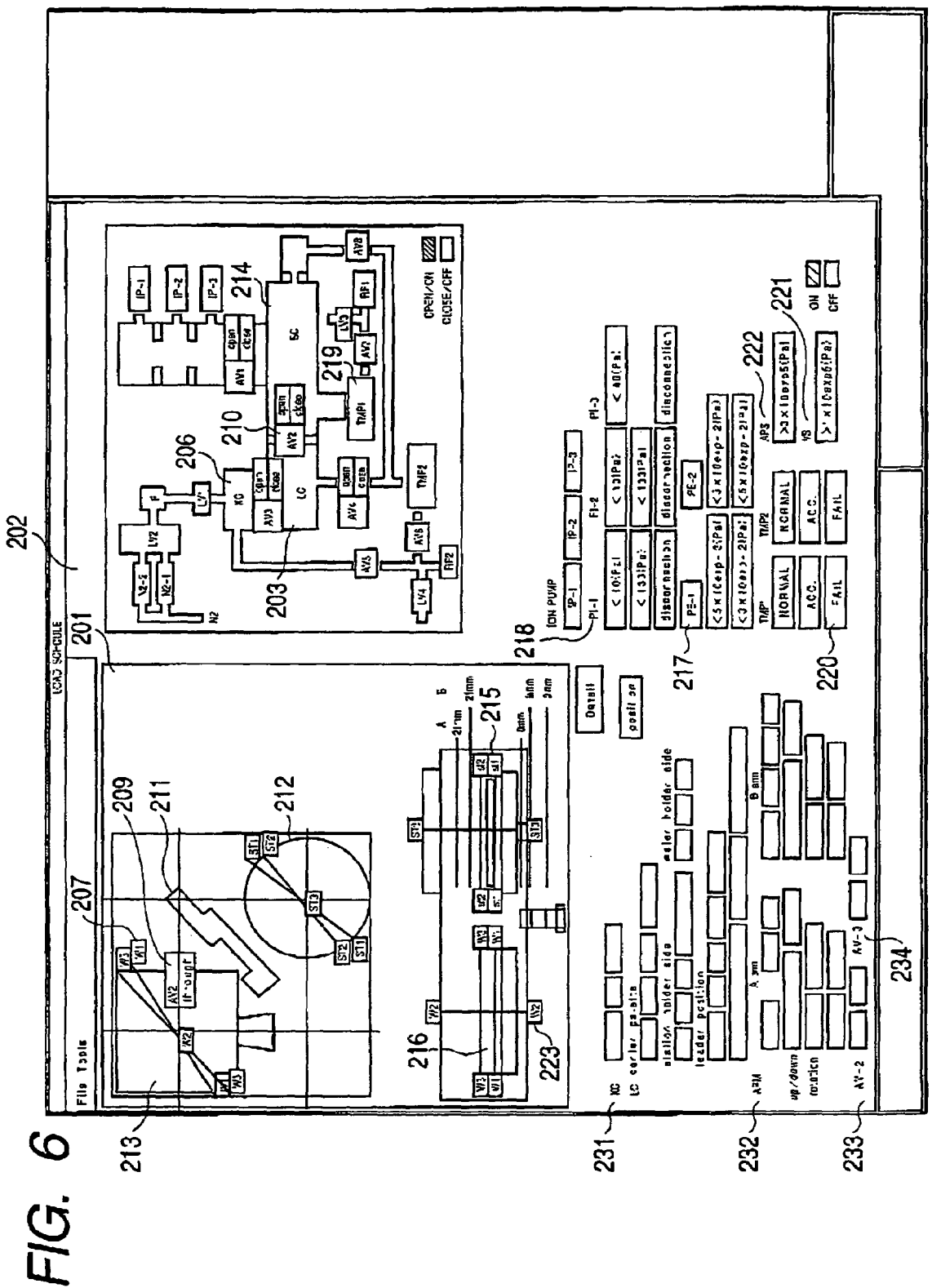
FIG. 6 is a display screen chart showing a detail of an exhaust system chart.

FIG. 6 shows the detail of the exhaust system chart 122 and FIG. 7 is an overall chart which collectively indicates symbols of constituent parts of the exhaust system used in FIG. 6 and check points for operation and inspection.

FIG. 6 is one screen of the display panel arranged in the inside of the display part and displays the layout (upper side) of the constituent elements of the wafer transport system (left side) and the exhaust system (right side) and the operation state of the main constituent elements (bottom side) using lamps.

With respect to the layout (left upper side) 201 of the wafer transport system, the inside of the loader chamber (LC) 203 is illustrated. ST1 indicated by numeral 204 to ST3 indicated by numeral 205 are sensors which monitor the mounting state of the wafer when the wafer in the inside of a sample exchange chamber (XC) 206 is loaded or unloaded. The ST1 sensor monitors whether the wafer is accurately mounted on a station holder or not.

W1 indicated by numeral 207 to W3 indicated by numeral 208 are sensors which monitor the mounting state of the wafer on the wafer holder. The W1 indicated by numeral 207 monitors whether the wafer is accurately mounted on the wafer holder, and the W2 indicated by numeral 223 monitors the presence of the wafer, and the W3 indicated by numeral 208 monitors whether the wafer is slanted or not.

Further, "AV2 Though" 209 monitors whether a foreign material is present on AV2 indicated by numeral 210 when AV2 indicated by 210 is opened or after the wafer holder is loaded or unloaded in and the sample chamber.

In the inside of the LC, two wafer transport arms 211 are disposed, wherein an A arm is used when the wafer is transported from a center pallet 212 to the station holder 213.

When the wafers are loaded to the sample chamber, an air lock valve (AV2) 210 is opened and the wafers are transported to the SC on rails. The ST side wafer 215 and the W side wafer 216 in the drawing are loaded and unloaded using transport spaces by means of two arms A, B at the station holder side (ST) and the wafer holder side (W) capable of covering two sheets of wafers respectively.

Chambers which constitute the wafer transport system are comprised of three chambers consisting of XC indicated by numeral 206, LC indicated by numeral 203 and SC indicated by numeral 214. A panel portion for monitoring the operation state of the LC which is positioned at the center out of these chambers is disposed at the left lower side of the drawing. An LED light position sensor detects the movement of a movable mechanism part and performs a lamp display.

On the other hand, with respect to the layout of the exhaust system (upper right side), chambers, pumps, valves and piping are displayed in an illustrated manner, wherein the pumps and valves are displayed such that lamps are turned on during electricity is supplied and the valves are open, while during feeding of electricity is interrupted and the valves are closed, the lamps are turned off.

The operation monitor panel of the exhaust system automatically performs the pump changeover operation using a vacuum gauge and hence, with respect to Penning gauges (Pe) 217 and Pirani gauges (Pi) 218, the operation monitor panel performs a panel display such that a lamp flickers at the changeover degree of vacuum being at a point 1 to 2. With respect to a turbo molecular pump (TMP) 219, erroneous operations (Fail) 220 are particularly displayed by lamps so as to enable an operator to take a prompt counter measure. Lamps are also lit when an atmospheric pressure gauge (APS) 221 and a valve driving air pressure (APS) 222 are in a normal operation. Further, the pressure level in the inside of the vacuum chamber is displayed as black when the pressure is the atmospheric pressure and the display color is changed to red, yellow, blue and green corresponding to the decrease of pressure.

The state of the XC is displayed by 231, the state of the ARM (A arm, B arm) is displayed by 232, the state of the AV2 is displayed by 233 and the state of the AV-3 is displayed by numeral 234.

Figure 8:
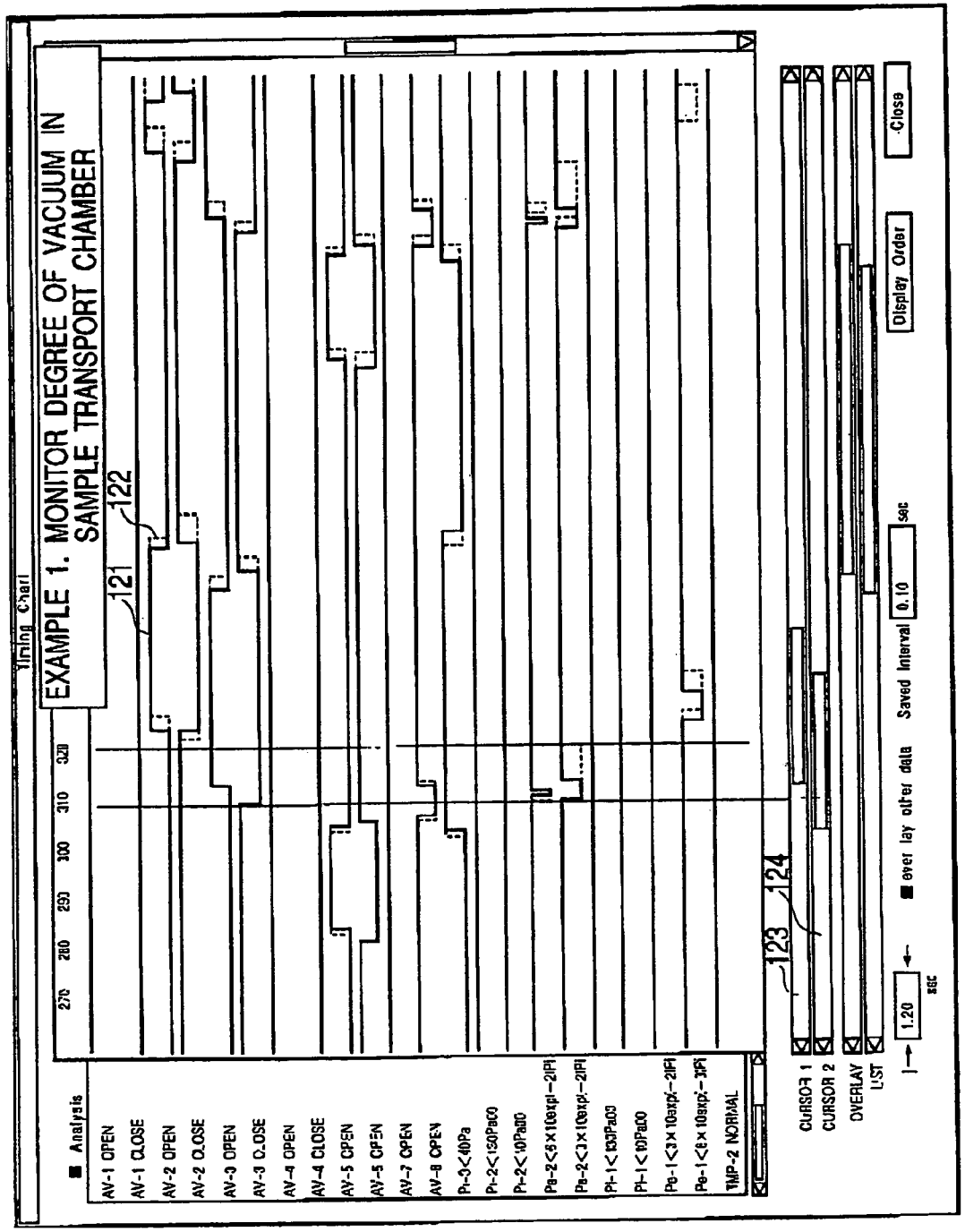
FIG. 8 is a timing chart which displays the basic monitor data and the monitoring history data with respect to constituent parts for monitoring the degree of vacuum in an exemplary case and compares the respective data in an overlaid manner.

FIG. 8 shows a timing chart which displays the basic monitor data and the monitoring history data with respect to respective constituent parts for monitoring the degree of vacuum in the example 1 and compares respective data in an overlaid manner. In the drawing, numeral 121 indicates the basic monitoring data and numeral 122 indicates the monitoring history data. That is, the stored basic data and the stored monitoring data 79 which are shown in FIG. 3 are displayed on the screen using the function of the workstation 81.

In an example shown in FIG. 8, with respect to respective items, AV-1 OPEN, AV-1 CLOSE, AV-2 OPEN, AV-2 CLOSE, AV-3 OPEN, AV-3 CLOSE, AV-4 OPEN, AV-4 CLOSE, AV-5 OPEN, AV-5 CLOSE, AV-6 OPEN, AV-6 CLOSE, AV-7 OPEN, AV-8 OPEN, P: $-3<40$ Pa, Pi-2<133 Pa (L), Pi-2<10 Pa (H), Pe-2<5×10 exp(−2)P, Pe-2<3×10 exp(−2)P, Pi-1<133 Pa (L), Pi-1<10 Pa (H), Pe-1<3×10 exp(−2)P, Pe-1<6×10 exp(−3)P and TMP-2Normal which are items of Analysis, the basic monitoring data 121 and the monitoring history data 122 are respectively indicated by black and red in a simultaneous parallel method and both data can be compared in an overlaid manner.

At a lower portion of the drawing, two longitudinal lines 123, 124 are drawn extending over respective items using cursors 1, 2 (123, 124). Accordingly, the item in which a trouble may occur between them, that is, Pe-2<3×10 exp(−2)P, in this case, can be readily recognized as the check item.

In the same manner, by moving the cursors, the items whose difference between both data is increased can be readily recognized as the check items.

Figure 9:
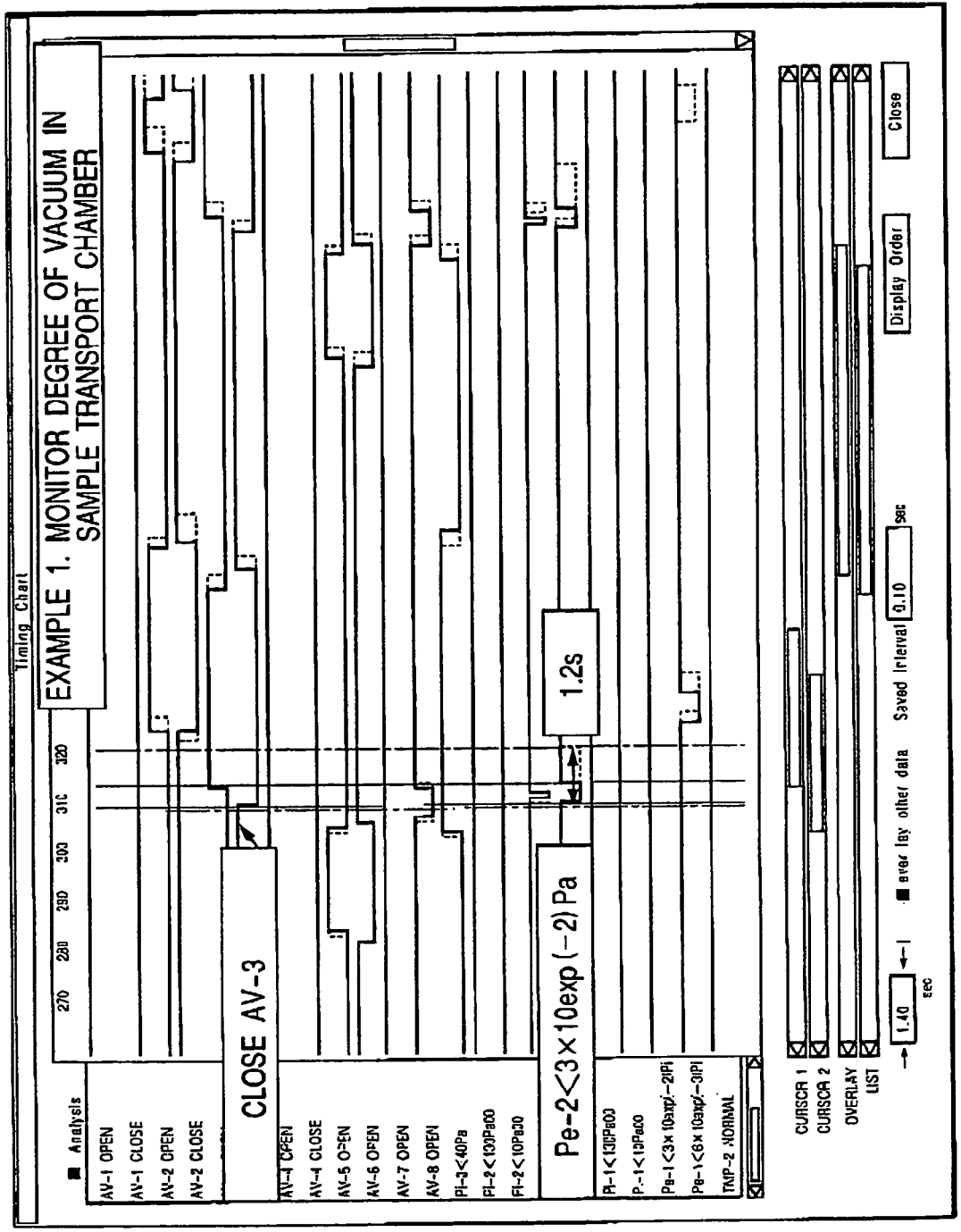
FIG. 9 is a timing chart which shows the differences in the vacuum recovery time of Pe-2 with respect to the example of FIG. 8.
Figure 10:
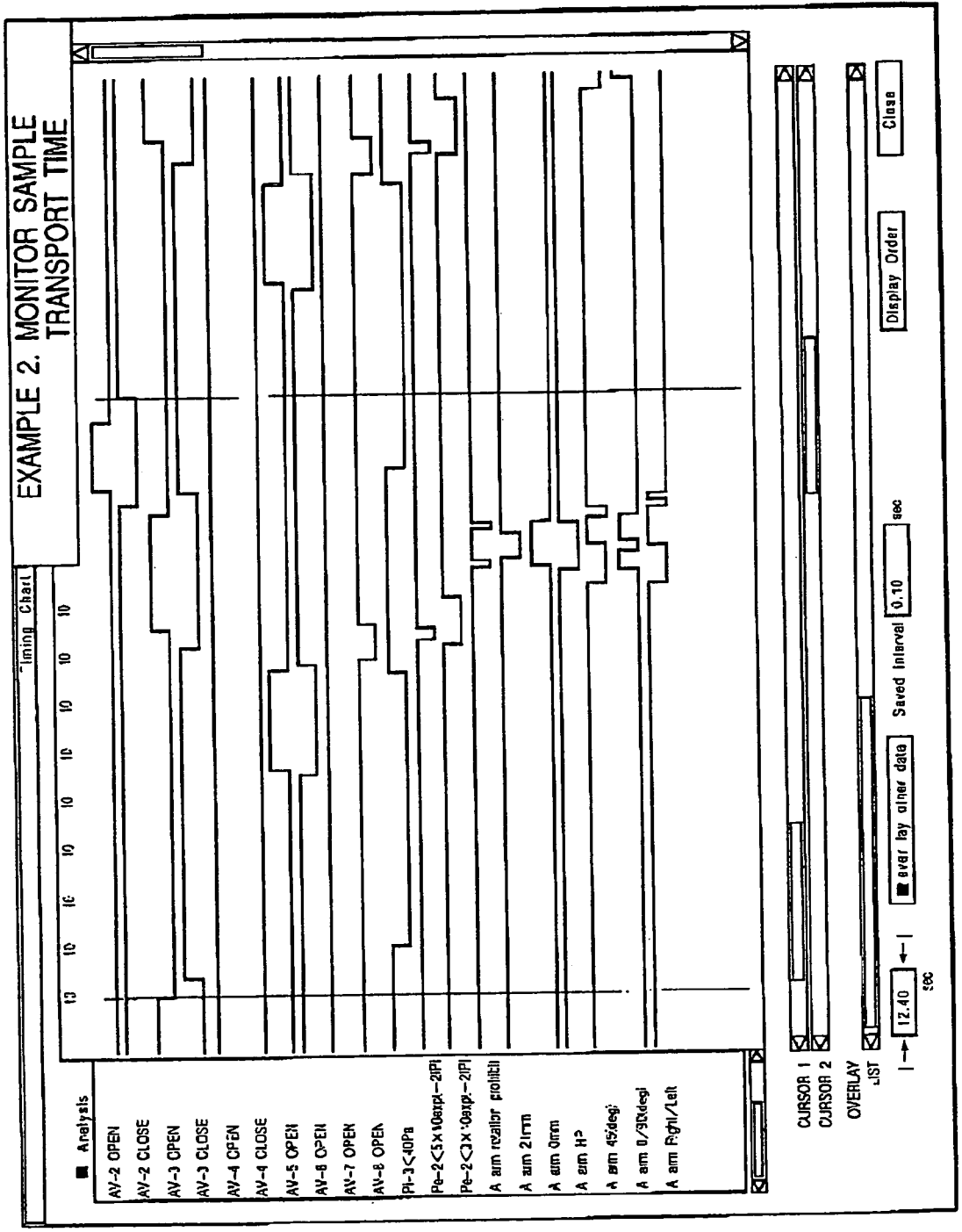
FIG. 10 is a timing chart which shows an example in which the sample transport time monitoring is performed using the timing chart.

FIG. 9 shows the difference in the vacuum recovery time of Pe-2 with respect to the example of FIG. 8. In this example, time necessary for recovering vacuum after the vacuum in the transport chamber 20 is temporarily deteriorated when the AV-3 valve is closed is shown. With respect to the basic monitoring data (black line) which constitutes the reference data, the vacuum pressure recovers at $3\times10^{-2}$ Pa after lapse of 0.4 seconds when the AV-3 is closed. However, the measured monitoring history data takes 1.2 seconds. It is instantaneously judged that there exists the time difference of 0.8 seconds, 13 times. Accordingly, it is recognized that some vacuum failure occurs on the device as an object with respect to the measured item. However, with respect to the time difference of other items, there exist substantially no difference between both data and the time difference is substantially the same and hence, it is predicted that some trouble has occurred with respect to the operation of the AV-3 valve. In this manner, since the basic monitoring device and the monitoring history data are displayed in the form of timing chart in which the devices indicated by a plurality of items are arranged in parallel simultaneously and hence, it can be easily predicted that some trouble has occurred with respect to the AV-3 valve. A message that the predicted AV-3 valve should be readily checked is reported and instructed. FIG. 10 shows an example 2. That is, FIG. 10 shows an example in which the sample transport time monitoring is performed using the timing chart. As items of Analysis, AV-2 OPEN, AV-2 CLOSE, AV-3 OPEN, AV-3 CLOSE, AV-4 OPEN, AV-4 CLOSE, AV-5 OPEN, AV-6 OPEN, AV-7 OPEN, AV-8 OPEN, Pi-3<40 Pa, Pe-2<5×10 exp(−2)P, Pe-2<3×10 exp(−2)P, A arm rotation prohibit, A arm 21 mm, A arm 0 mm, A arm HP, A arm 45 (deg), A arm 0/10 (deg) and A arm Right/Left are adopted. Longitudinal lines are added to the AV-2 CLOSE and the AV-2 OPEN using cursors 123, 124 and these times are measured and the basic monitoring data and the monitoring history data are overlaid and compared in the same manner as the example 1.

Figure 11:
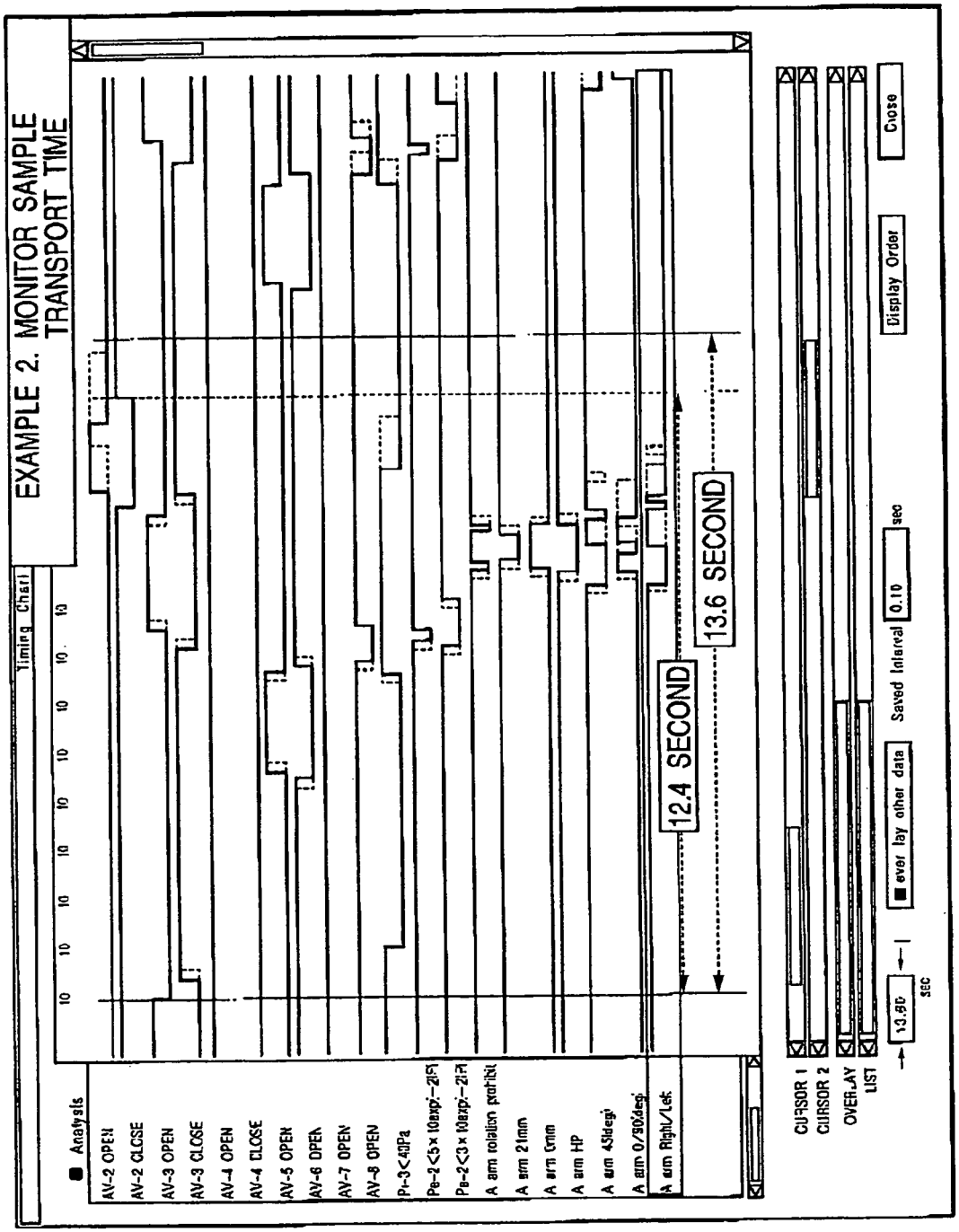
FIG. 11 is a timing chart which shows the difference in sample transport time with respect to the example of FIG. 10.

FIG. 11 displays the difference in sample transport time with respect to the example shown in FIG. 10. This example is an example which compares the sample transport time in the transport sequence. The transport time for reference data is 12.4 seconds and the time for monitoring data is 13.6 seconds and hence, there exists a delay of 1.2 seconds between the monitoring data and the reference data. Although the difference of 10% (1.2 seconds) usually does not constitute any serious problem, in this example, with respect to the operation time of the position sensor of the A arm (A arm Right/Left), compared to the operation time of the reference data which is 1.9 seconds, the operation time of the monitoring data is 3.1 seconds thus exhibiting the large difference (163%). It is judged from this timing chart that the operation speed of the transport arm A is remarkably lowered so that the maintenance is necessary. In this manner, by displaying both data in the form of timing chart with respect to the movement of these elements using a plurality of items, that is, AV-2 CLOSE and AV-2 OPEN, it can be easily predicted that a trouble has occurred in the operation of the transport arm A. A message that the transport arm A which is predicted in this manner should be immediately checked is reported and instructed.

The process (the state of process) from the past recorded data which are collected and sampled to the occurrence of trouble in the device is displayed dynamically using drawings in an overlaid manner. Further, by incorporating (forming) the function of automatically producing the timing charts of respective driving systems and the timing chart of the vacuum valve OPEN/CLOSE into the device, it is possible to monitor the device state in real time.

By adding these data collection functions concerned with vacuum, it is possible to monitor and record the state of all sensors collectively and in real time so that a burden of a maintenance man in charge of maintenance can be reduced with respect to the maintenance control of the device and the countermeasures against troubles.

Further, by recording and preserving the collected data, it is possible to grasp the time-sequential transition of operation state of the device so that it is possible to optimize the countermeasures against troubles such as the retroactive searching of the period in which the trouble occurred, focusing on the cause of the trouble and exchanging of parts.

Besides the above countermeasures, by adding the function of recording and preserving the operation state of the device when the trouble occurred in the device, it is possible to confirm the device state when the trouble occurred.

As the basic monitoring data, it is possible to adopt a portion of the preliminarily registered data or the stored operation history data.

a. Architecture of Basic Data (1) At the time of inspecting the device which are delivered from a factory, the sampled data and the design value template are compared so that the state of the device is grasped. When it is judged abnormal from this data, it is judged that the device is defective.

(2) When it is judged that the device is normal from the result of comparison performed in (1), the sampled data at the time of delivering the device from the factory is registered in a database as the reference data of the device.

(3) The reference data at the time of installation is collected and registered at the time of installing the device at a client (the sampling and registration of the reference data at the client site is sampled since the vacuum exhaust speed changes depending on the installation environment).

(4) The state of the device after installation is confirmed.

Data obtained in (2) and (3) are compared so as to grasp the state of the device at the time of installation. It is judged whether the device state after installation is normal or abnormal based on this comparison data.

(5) Judging method

It is considered that the device state which changes depending on the mounting state at the installation site is mainly derived from the change of vacuum exhaust speed. This is because that the vacuum exhaust speed is influenced by the length of a pipe between a vacuum pump and devices at the installation site, the diameter of the pipe, and the exhaust speed (vacuum discharge ability) of the pump.

The device states which are influenced by the above-mentioned change of environment are as follows.

The transition of the vacuum gauge and the loading of the sample and the like are considered. It is judged whether they are normal or abnormal based on following formulae based on the exhaust capacity.

Exhaust ability at factory environment: Pf
Exhaust ability at installation environment: Pi
Transition of vacuum gauge at factory environment: Gf
Transition of vacuum gauge at installation environment: Gi
Sample loading speed at factory environment: Lf
Sample loading speed at installation environment: Li
Threshold value of judgement: S (%)
Correction factor: Co=Pf/Pi
Calculation data for judgement
Vacuum gauge (RefG)=Co×Gf, loading speed (RefL)=Co×Lf
Judgement of transition of vacuum gauge at the time of installation $$S > |Gi/RefG \times 100 - 100|$$

Sample loading speed at the time of installation $$S > |Li/RefL \times 100 - 100|$$

(6) Preparation of reference template which matches installation environment

RefG and RefL are registered as the state templates which match the installation environment. However, other templates use design values.

b. Sampling of Data and Automatic Analysis After Transfer of Device to Client (1) Sampling of the device state data is performed such that loading, measuring and unloading of the samples are performed based on the preset sequence.

(2) It is possible to set the data sampling schedule for every client. The data acquisition timing is performed during time when the device is not used. However, when the device is still being used even when one hour or more lapses from the preset time, the acquisition schedule is cancelled. Further, the client can manually start the data sampling sequence.

(3) The device state data which is automatically sampled is compared with the device state templates which are preliminarily registered. When the compared data exceeds the predetermined threshold value, the information is stored in the device database. Further, the information is reported to the client or the maintenance man by setting.

Due to such functions, it is possible to obtain the preventive maintenance effect and to grasp the device maintenance time.

c. Processing at the Time of Occurrence of Trouble in Device (1) The state of the device at the time of the occurrence of error is sampled using an error trap function.

Simultaneously with such sampling, the content of communication in the inside of the device is preserved.

(2) The reference data on the device state at the time of occurrence of error and the reference data on the device state at the time of installation are compared so as to specify a cause of the trouble of the device.

Due to such a function, it is possible to take a countermeasure at the time of the occurrence of trouble in the device.

Figure 12:
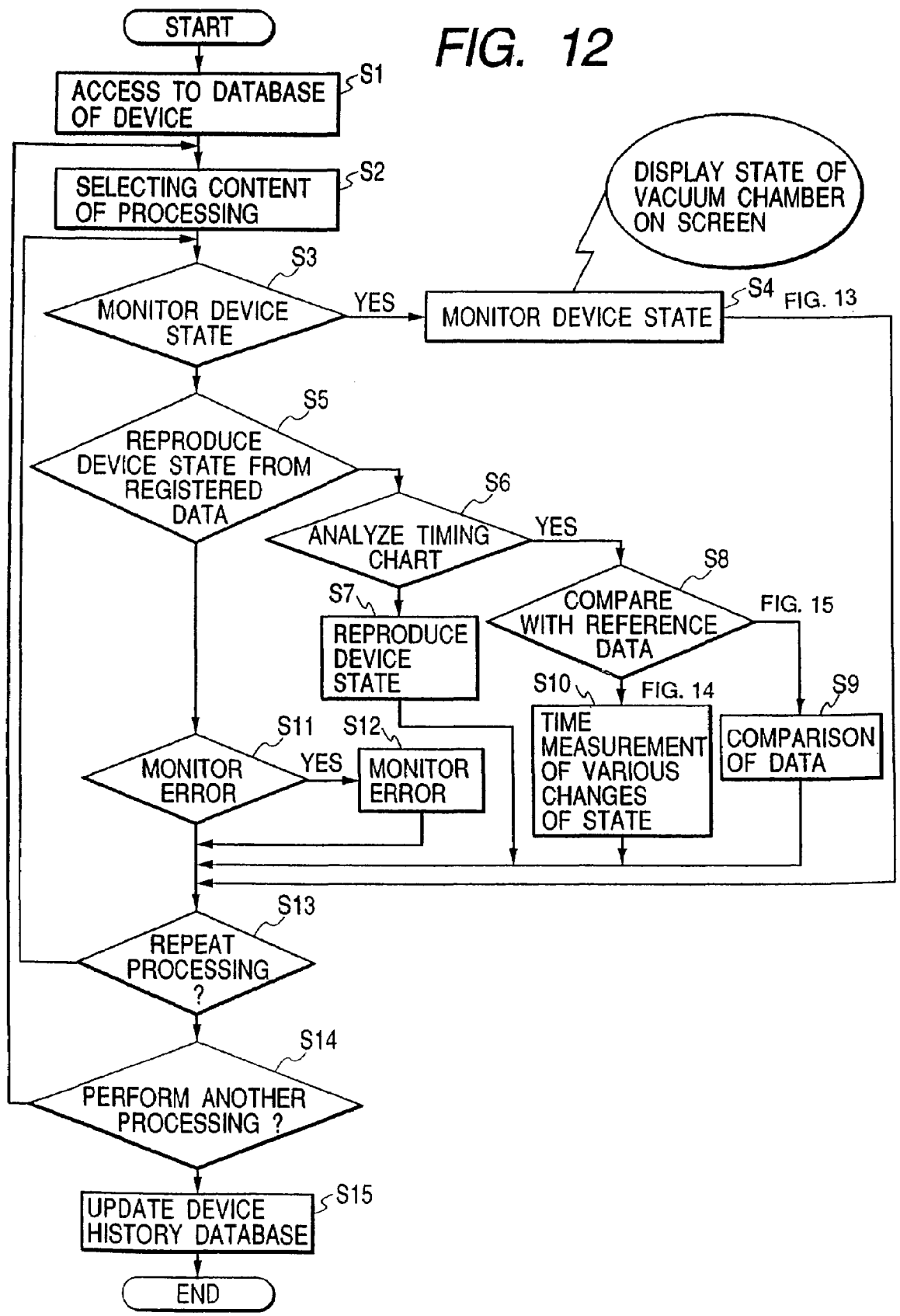
FIG. 12 is a flow chart showing an overall view for supporting the maintenance and the monitoring of trouble of the device in the computer system of the length-measuring SEM.
Figure 13:
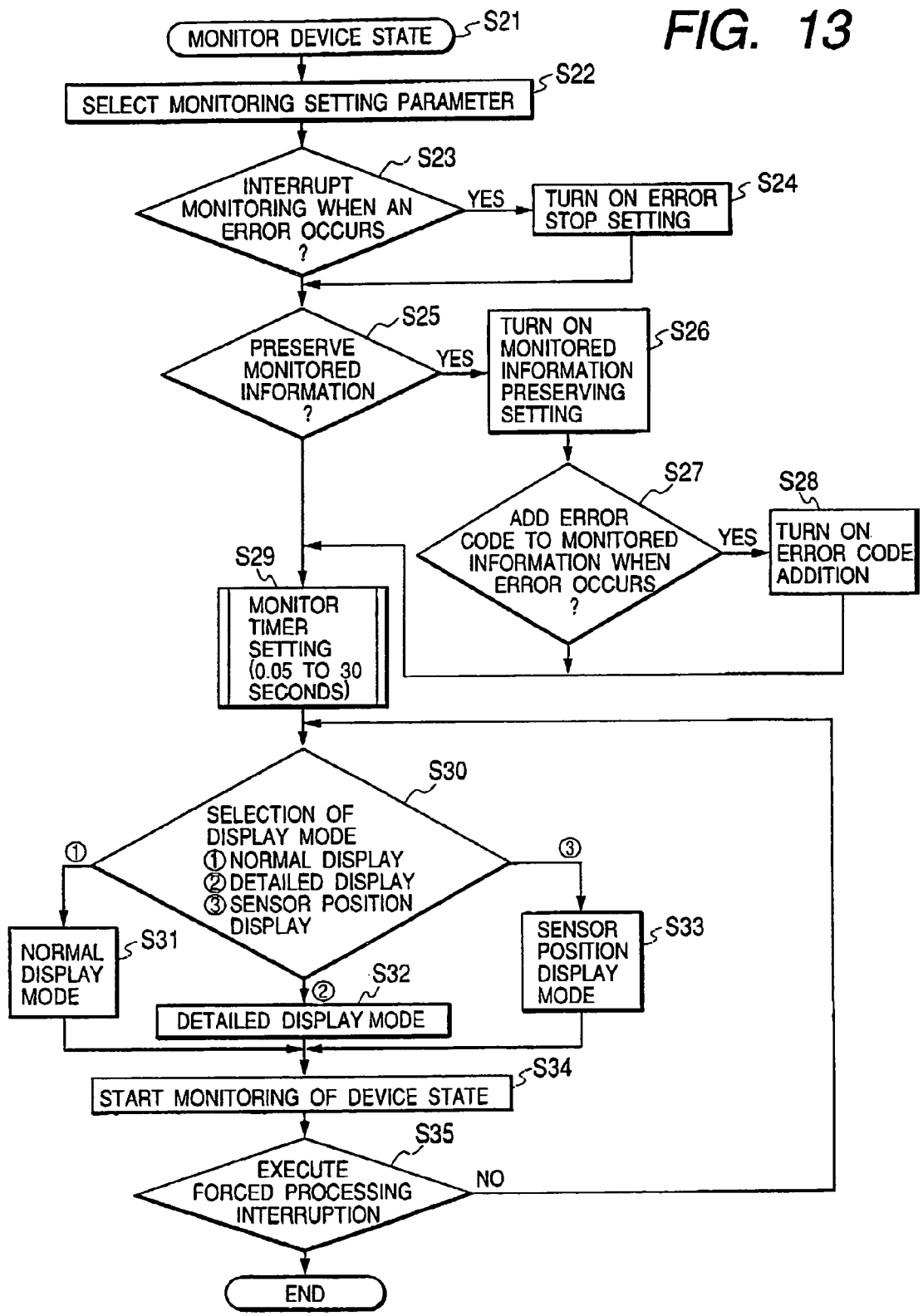
FIG. 13 is a flow chart for performing the step of monitoring the device state (S4 of FIG. 12)
Figure 14:
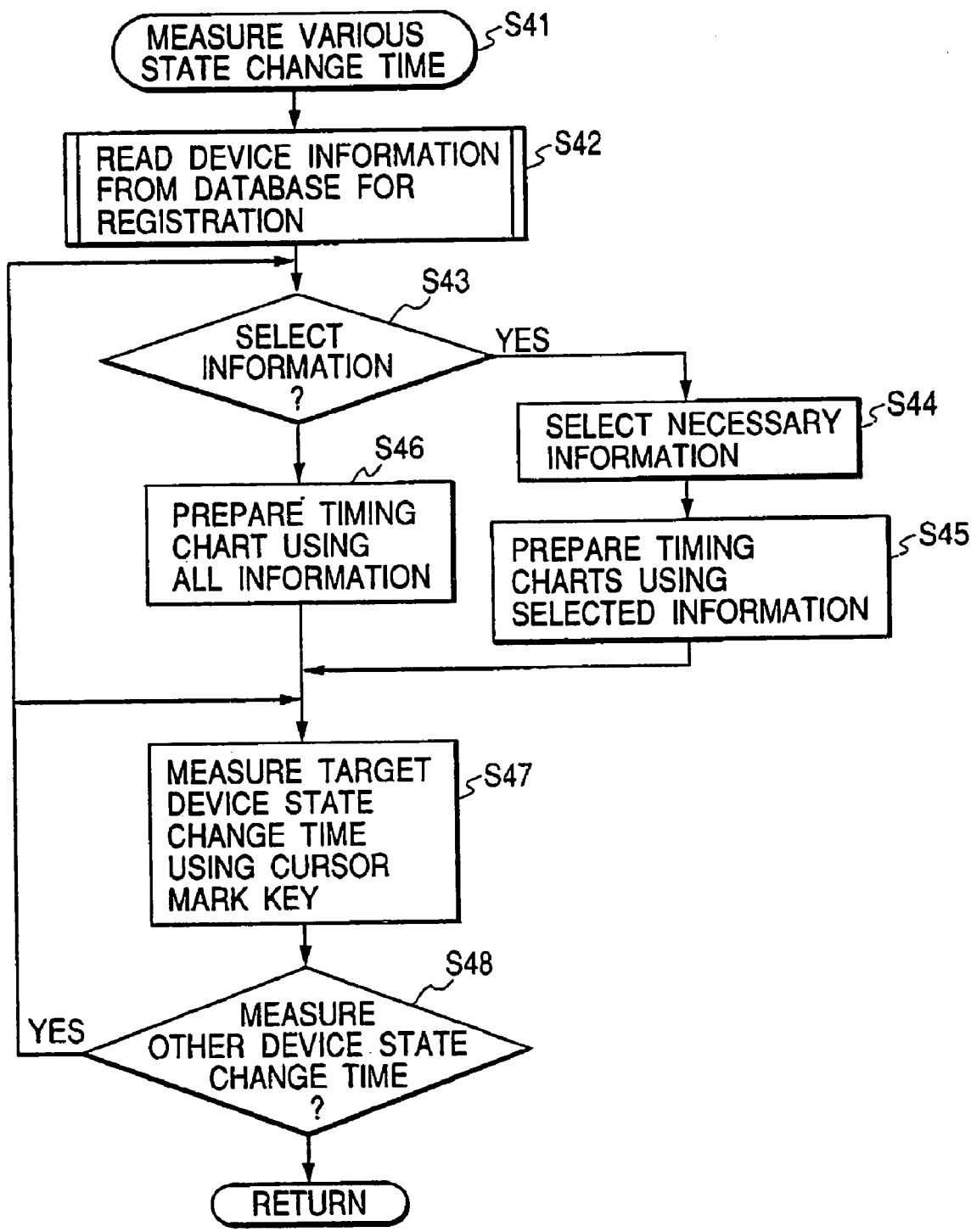
FIG. 14 is a flow chart for performing the step of measuring various state change time (S10 of FIG. 12)
Figure 15:
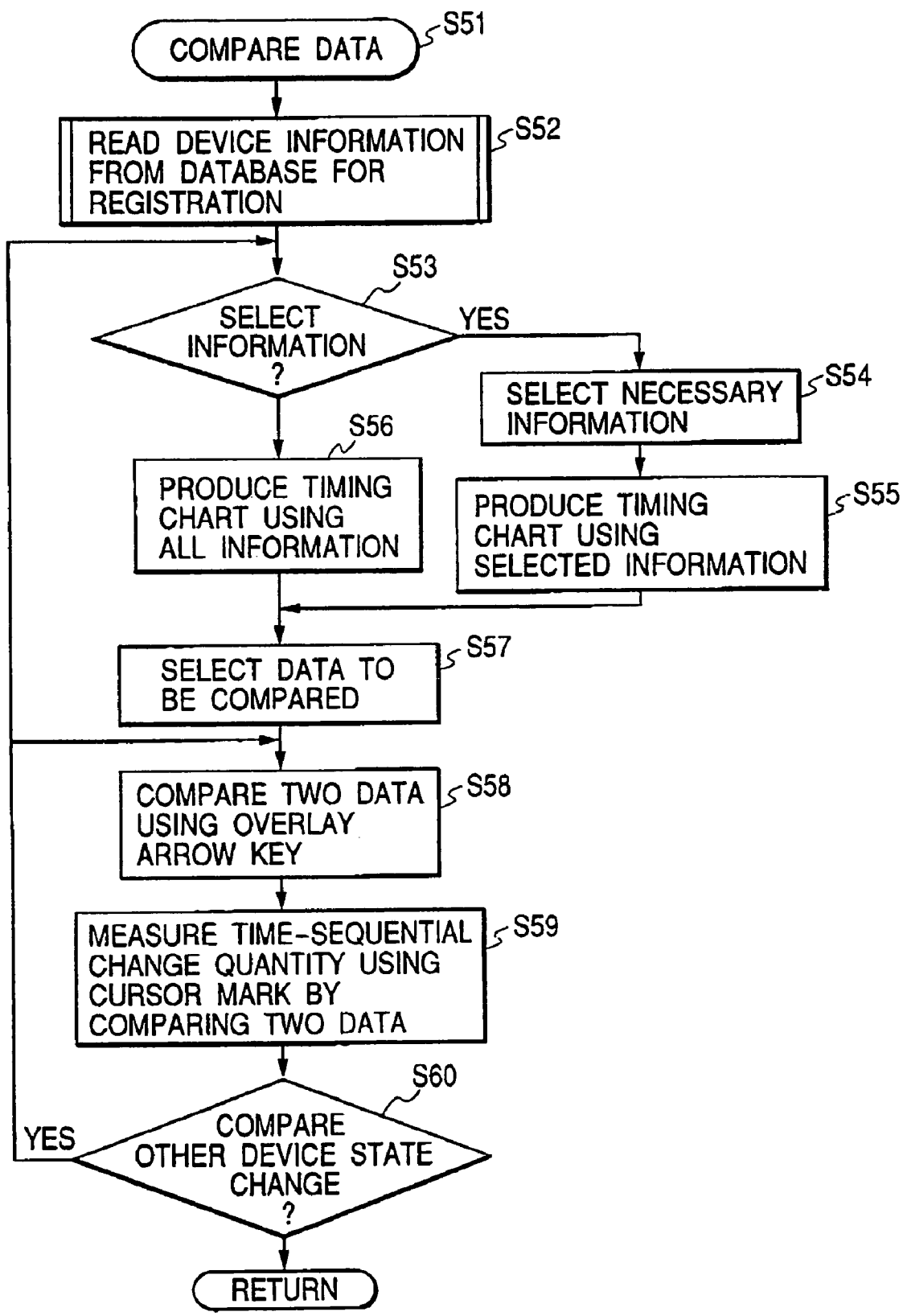
FIG. 15 is a flow chart for performing the step of comparing data (S9 of FIG. 12)

FIG. 12 is an overall view of a flowchart for supporting the maintenance and the monitoring of trouble of the device in the computer system of the length-measuring SEM and FIG. 13 to FIG. 15 are partial views showing essential parts of FIG. 12 in detail. In FIG. 12, the support system gets access to the database in the device (S1), selects the processing content (S2), and judges whether the monitoring of the device state is to be performed or not (S3). When the judgement is affirmative, the monitoring of the state of the device is performed (S4). Here, the device state monitoring data is preserved in real time.

The processing is advanced from step S3 to step S5, wherein the device state from the registered data is reproduced and whether the analysis using the timing chart is to be performed or not is judged (S6) and the device state is reproduced (S7). Here, the preserved device state monitoring data is reproduced. It is judged whether the comparison with the reference data is to be performed or not (S8). Then, both data are compared (S9) or the measurement of time for change of various states is performed (S10). The comparison of both data is performed in accordance with the previously mentioned example 1 and example 2. In this case, however, the comparison and judgement of templates may be performed as shown in FIG. 16. In FIG. 13, with respect to the partial data 300 sampled from the device in step S8, data to be compared may be cut and pasted to a preliminarily set plate so as to display the comparison and the result.

A judging method is performed based on a following formula.

Threshold value for judgement>|sampling data/template data×100−100|

In FIG. 12, the processing is advanced from step S5 to S11 and it is judged whether error monitoring is to be performed or not (S11) and then the error monitoring is performed.

In Step S13, it is judged whether the processing is to be repeated or not. Further, it is judged whether another processing is to be performed or not (S14). Then, updating of the history database of the device is performed (S15).

FIG. 13 shows a flowchart for performing the monitoring of device state in step S4. In the drawing, when the monitoring of device state is performed (S21), the selection of monitoring setting parameters is performed (S22). Then, it is judged whether the monitoring is to be interrupted when an error occurs or not is judged (S23). Then, the error stop setting is turned on (S24). Further, it is judged whether the monitoring information is to be preserved or not (S25) and the monitoring information preserving setting is turned on (S26).

It is judged whether an error code which is generated when the error occurs is to be added to the monitoring information or not (S27). When the error code addition is turned on (S28), the processing is advanced to step S29 and monitoring timer setting (0.05 to 30 seconds) is performed (S29). It is judged whether the selection of display mode is to be performed or not (S30) and one mode is selected from a standard display mode(S31), a detailed mode (S32) and a sensor position display mode (S33). The monitoring of the device state is started based on the selected mode (S34). Then, it is judged whether the forced processing interruption is to be executed or not (S35) and the processing is finished.

FIG. 14 shows a detailed flow of the step S10. In the drawing, in measuring various state change time (S41), the data information is read from the registered data base (S42), it is judged whether the information is selected or not (S43), the necessary information is to be selected (S44), and the timing chart is produced based on the selected information (S45). Further, the timing chart is produced based on the total information (S46), and the targeted device state change time is measured using cursor arrow keys (S47), and it is judged whether other device state change time is to be measured or not (S48), and the processing returns.

FIG. 15 shows a detailed flow of the step S11. In the drawing, in performing the comparison of data (S51), the data information is read from the registered data base (S52), it is judged whether the information is selected or not (S53), the necessary information is selected (S54), and the timing chart is produced based on the selected information (S55). Further, the timing chart is produced based on the total information (S56), and data to be compared are selected (S57), and two data are compared using an overlay arrow key (S58). Time change quantity is measured using cursor arrow keys by comparing two data (S59), and it is judged whether other device state change is to be compared or not (S60), and the processing returns.

As described above, according to these steps, it is possible to obtain following advantageous effects.

(1) The device state is periodically sampled so that the device state database can be constructed.

(2) It is possible to compare the sampled data with the data registered in the database.

(3) It is possible to reproduce the state in which the trouble occurs in the device based on the error trap function. By comparing the data in the troubled state and the data in the normal state, the specifying of a cause of the trouble can be remarkably enhanced.

(4) By setting up templates with respect to ON/OFF timing of respective sensors and an operation speed of the mechanical system which constitute design values, it is possible to compare them with the sampled data. Further, when the sampled data are compared with the templates, the difference between the sampled data and the templates are automatically calculated, and when the difference exceeds a predetermined threshold value, the information is stored in the database. Due to the addition of this function, it is possible to cope with the periodical maintenance and the preventive maintenance.

Due to such constitutions, following systems and methods are provided.

In a system and a method for supporting monitoring and diagnosing of maintenance and troubles related to the measuring device to which accelerated electron beams are applied in vacuum, data from the operation monitoring sensors during the starting step and the measuring step of the measuring device are recorded and preserved in real time and synchronously. Then, timing and operation level are compared and reproduced by overlapping the data with data at the time of initial or normal operation. Further, when the difference which indicates that the maintenance is necessary or it is diagnosed that the trouble occurs is detected on data, probable trouble cause items are selected from pre-stored selection items on troubles and countermeasures against the troubles. Then, the result obtained by executing the preliminarily prepared confirmed matters for specifying the trouble causes are inputted so as to further specify the causes whereby the system and the method can support the maintenance and diagnosis of the device, and can preserve and make use of the diagnosis data.

A system and method which adopts a system for supporting monitoring and diagnosing of maintenance and troubles by providing the position sensors and vacuum sensors to the electron lens/wafer driving parts and supply/exhaust parts of the length-measuring SEM.

A system and method in which the data is compared with data at the time of initial or normal operation and when the difference which indicates that the maintenance is necessary or it is diagnosed that the trouble occurs is detected on data, the difference is preserved.

A system and method in which the operation state of the measuring device is monitored using a remote device or the difference detection timing is alarmed using a remote device.

A system and method which uses the length-measuring SEM (Scanning Electron Microscope), a SEM/TEM (Transmission Electron Microscope) or a mass spectrometer as the measuring device which uses accelerated electron beams in vacuum.

A system and method for monitoring maintenance and troubles related to measuring device which uses accelerated electron beams in vacuum.

Since the accelerated electron beams which constitute measuring means must be generated in vacuum, to perform the maintenance and the diagnosis thereof, it is necessary to open the device so as to allow atmosphere to enter into the inside of the device conventionally. This makes the maintenance and the diagnosis difficult. By detecting a plurality of positions and movements related to the functions and performances of the electro-optic system, the vacuum exhaust system and the sample driving system in the inside of the device, the degree of vacuum and gas components, time and speed, image information and the like, the comparison between the detected data and the data in the initial state or the normal state can be performed on line simultaneously and in real time, whereby the device can instantly cope with the maintenance, the search of cause of trouble and countermeasures in an optimum manner.

What is claimed is:

1. A method of supporting, monitoring and diagnosing maintenance and troubles related to a measuring device, said method comprising the steps of:

recording and preserving data from operation monitoring sensors during a starting step and a measuring step of the measuring device in real time and synchronously;

comparing current data received from the monitoring sensors during the measuring step with recorded data received from the monitoring sensors and being associated with initial operation or normal operation of the measuring device by overlapping the current data with the recorded data;

selecting probable trouble cause items from pre-stored selection items on troubles and countermeasures against the troubles when there is a difference between the current data and the recorded data that indicates that maintenance is necessary or that an error has been detected;

executing predetermined measures based on results of the selecting step to further diagnose the trouble causes so as to further specify the causes; and continuing the monitoring, maintenance and diagnosis of the device after the executing step.

2. The method according to claim 1,
wherein the measuring device is a critical dimension type scanning electron microscopy (CD-SEM), and said method comprises the act of providing position sensors and vacuum sensors to electron lens/wafer driving parts and supply/exhaust parts of the CD-SEM.

3. The method according to claim 1, further comprising the steps of:

comparing the current data from the operation monitoring sensors with the recorded data at the time of initial or normal operation; and preserving the difference between the current data and the recorded data when the difference indicates that maintenance is necessary or that an error has been detected.

4. The method according to claim 1, further comprising the steps of:

monitoring the measuring device using a remote device; and alarming the difference between the current data and the recorded data using the remote device.

5. The method according to claim 1,
wherein the measuring device is one of a Critical Dimension type Scanning Electron Microscope, a Transmission Electron Microscope, and a Mass Spectrometer.

6. The method according to claim 1, wherein the measuring device uses accelerated electron beams in a vacuum.

7. A system for supporting, monitoring and diagnosing maintenance and troubles related to a measuring device, comprising:

a recording unit for recording and preserving data from operation monitoring sensors during a starting step and a measuring step of the measuring device in real time and synchronously; and a processor for comparing current data received from the monitoring sensors during the measuring step with recorded data received from the monitoring sensors and being associated with initial operation or normal operation of the measuring device by overlapping the current data with the recorded data, selecting probable trouble cause items from pre-stored selection items on troubles and countermeasures against the troubles when there is a difference between the current data and the recorded data that indicates that maintenance is necessary or that an error has been, executing predetermined measures based on results of the selecting step to further diagnose the trouble causes so as to further specify the causes, and continuing the monitoring, maintenance and diagnosis of the device.

8. The system according to claim 7,
wherein the measuring device is a critical dimension type scanning electron microscopy (CD-SEM), and said system further comprises position sensors and vacuum sensors provided to electron lens/wafer driving parts and supply/exhaust parts of the CD-SEM.

9. The system according to claim 7,
wherein the processor compares the current data from the operation monitoring sensors with the recorded data at the time of initial or normal operation; and preserves the difference between the current data and the recorded data when the difference indicates that maintenance is necessary or that an error has been detected.

10. The system according to claim 7,
wherein the measuring device is monitored by a remote device and the difference between the current data and the recorded data is alarmed using the remote device.

11. The system according to claim 7,
wherein the measuring device is one of a Critical Dimension type Scanning Electron Microscope, a Transmission Electron Microscope, and a Mass Spectrometer.

12. The system according to claim 7,
wherein the measuring device uses accelerated electron beams in a vacuum.

* * * * *